April 26, 1960 J. E. COPE ET AL 2,934,602

TELEVISION RECEIVERS

Filed Feb. 4, 1955

Inventors
John E. Cope
Patrick A. Segrave
By
Holcombe, Wetherill & Brisebois
Attorneys

United States Patent Office 2,934,602 Patented Apr. 26, 1960

2,934,602

TELEVISION RECEIVERS

John Edward Cope and Patrick Arthur Segrave, Cambridge, England, assignors to Pye Limited, Cambridge, England, a British company Application February 4, 1955, Serial No. 486,242

10 Claims. (Cl. 178—7.3)

The present invention relates to television receivers and more particularly to automatic gain control circuits for automatically controlling the gain of the video signals in the receiver.

The present invention consists in a television receiver, wherein the de-modulated received video signal is applied to a clamping circuit to clamp the signal at black level during black level periods of the video waveform and the clamped waveform is applied to an input electrode of a valve which is so biased that the tips of the line and frame synchronising pulses produce a pulse voltage at an output electrode of the valve which is proportional to the height of the synchronising pulses, which pulse voltage is smoothed and applied as a control voltage to control the gain of the receiver. The clamping circuit may be controlled by pulses at line frequency in which case the clamping pulses which may be derived from the line output transformer, are delayed so as to occur during the back porch periods of the video waveform. Alternatively, the clamping circuit may be controlled by pulses occurring at frame repetition frequency in which case the pulses may be derived from the frame output transformer and be arranged so as to occur during the post-frame synchronising suppression period.

The output pulse voltage is preferably produced at the anode of the valve and is rectified and fed through a smoothing circuit to produce the automatic gain control voltage.

According to a feature of the invention the clamping circuit is arranged so that it does not operate during interference pulses, such as ignition pulses, thus preventing these interference pulses from altering the restoration level and thus affecting the control voltage produced.

In order that the invention may be more fully understood, reference will now be made to the accompanying drawings, in which.

Figure 1:
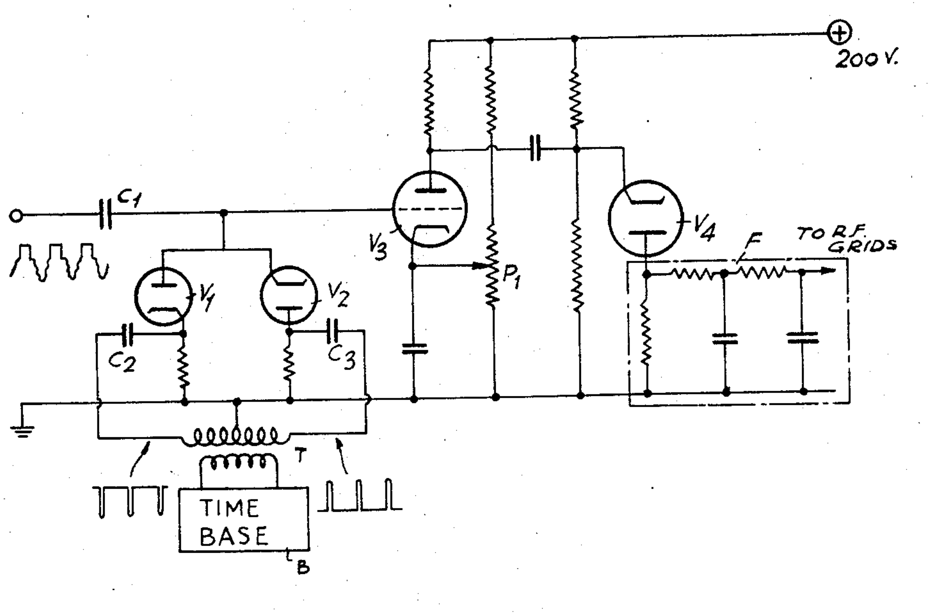
Figure 1 is a circuit arrangement occurring to the invention.

Referring to Figure 1, a negative-going video waveform is fed via capacitor C1 to the grid of triode valve V3, via a clamp circuit comprising the diodes V1 and V2. Clamp pulses which may be derived either from the line or from the frame output transformer T, fed from either the line or frame timebase B, are fed to the two diodes V1, V2 through condensers C2 and C3 respectively. The clamp pulses should have an amplitude of approximately 1.3 times the peak video waveform amplitude and are arranged to clamp the black level of the video waveform either during the back porch periods following the line pulses or during the post-frame-synchronising suppression periods. The triode valve V3 is biased by means of potentiometer P1, such that when the clamped video waveform is applied at the control grid, the positive-going tips of the line and frame synchronising pulses fall within the grid base and so that the valve is cut off during the picture period. Thus, negative-going pulses are obtained at the anode of V3 which are proportional in amplitude to the amplitude of the received video signal. These pulses are applied to the cathode of the rectifier diode V4 and the output from this rectifier is applied through a smoothing circuit F to the control grids of the radio frequency and/or intermediate frequency amplifiers of the receiver to control automatically the gain of these stages.

Figure 2:
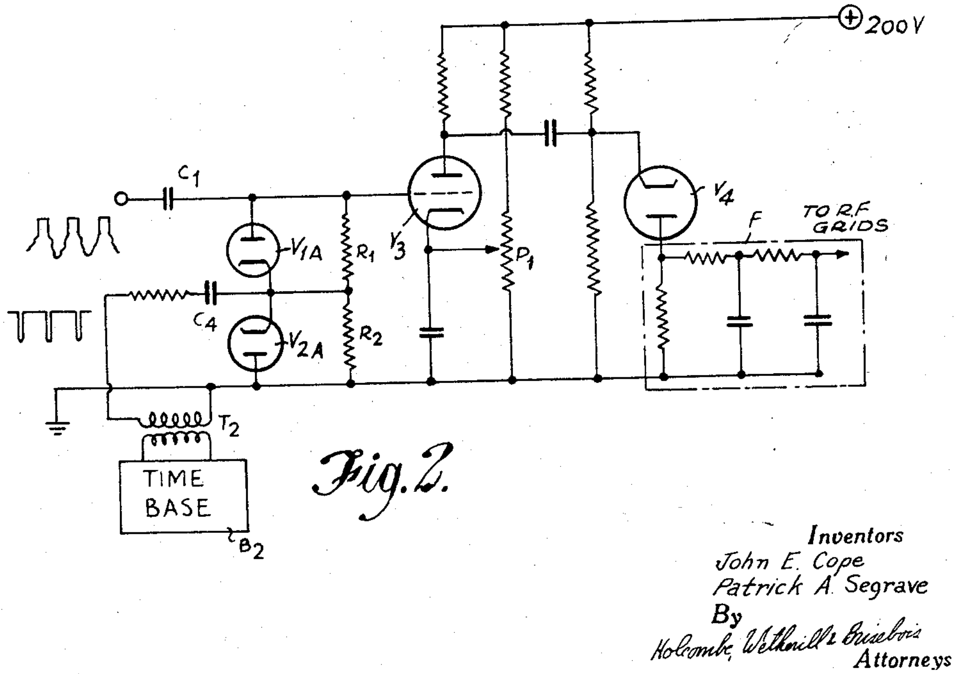
Figure 2 is a modified circuit arrangement.

Figure 2 shows a modified circuit arrangement in which the clamping circuit comprises two diodes V1A and V2A having their cathodes connected together and their anodes connected respectively to the grid of valve V3 and to earth, thus forming an arrangement in which the two valves are connected in series with opposite polarity across the grid input of valve V3. The clamping pulses at line or frame frequency derived from output transformer T2, fed from either the line or frame timebase B2, are applied to the junction of the cathodes of valve V1A and V2A via condenser C4, and the amplitude of the pulses need only be slightly greater than the amplitude of the synchronising pulses in the video waveform since the picture signal cuts off the diode V1A during the picture period. The negative tip of the clamping pulse is restored to earth by the action of the diode V2A. During the clamp pulse period the diode V1A conducts restoring the black level of the video waveform fed via capacitor C1, to ground, since both diode V1A and V2A conduct together. As this circuit will only clamp the waveform in one direction the resistor R1 is provided across the diode V1A to prevent valve V1A from becoming permanently cut-off. A resistor R2 is also connected across the diode V2A. Negative-going pulses are produced at the anode of valve V3 which are proportional in amplitude to the amplitude of the received video signal and which are rectified by the rectifying diode V4, smoothed, and applied as an automatic gain control voltage as described in the embodiment of Figure 1.

The embodiment of Figure 2 possesses the advantage that the diode V1A cuts-off during the presence of interference pulses, such as ignition pulses, and thus the restoration of the black level and the value of the D.C. automatic gain control voltage is not affected.

Whilst particular embodiments have been described it will be understood that various modifications may be made without departing from the scope of this invention.

We claim:

1. In a television receiver, an automatic gain control arrangement comprising a clamp device, means for applying a demodulated received television waveform comprising picture signals interspersed with blanking signals and line and frame synchronising signals to said clamp device, means for rendering said clamp device operative to clamp said waveform only during black level periods of said waveform, an electronic valve having an input electrode and an output electrode, means for applying said clamped waveform to said input electrode with the picture signals negative-going, means for biasing said electronic valve so that the line and frame synchronising pulses produce a pulse voltage at said output electrode which is proportional to the height of said synchronising pulses, and means for smoothing said pulse voltage to form a D.C. control voltage for automatically controlling the gain of at least one stage of the receiver.

2. In a television receiver, an automatic gain control arrangement comprising a clamp device, means for applying a demodulated received television waveform comprising picture signals interspersed with blanking signals and line and frame synchronising signals to said clamp device, means for rendering said clamp device operative to clamp said waveform only during black level periods of said waveform, an electronic valve having a grid electrode and an output electrode, means for applying said clamped waveform to said grid electrode with the picture signals negative-going, means for biasing said electronic valve so that the line and frame synchronising pulses produce a pulse voltage at said output electrode which is proportional to the height of said synchronising pulses, and means for smothing said pulse voltage to form a D.C. control voltage for automatically controlling the gain of at least one stage of the receiver.

3. In a television receiver as claimed in claim 2, said clamp device comprising two rectifiers each having an anode and a cathode, means connecting the anode of the first rectifier to said grid electrode, means connecting the cathode of said first rectifier to the cathode of said second rectifier, means connecting the anode of said second rectifier to a point of fixed potential, a separate resistor connected across each of said rectifiers and means for applying clamping pulses to the cathodes of said first and second rectifiers, said first rectifier being cut-off during interference signals whereby the automatic gain control voltage is unaffected by said interference signals.

4. In a television receiver as claimed in claim 2, said clamp device comprising two rectifiers each having an anode and a cathode, means connecting the anode of the first rectifier and the cathode of said second rectifier to said grid electrode, means connecting the cathode of said first rectifier, and the anode of said second rectifier to a point of fixed potential and means for applying clamping pulses to the cathode of said first rectifier and the anode of said second rectifier.

5. In a television receiver, an automatic gain control arrangement comprising a clamp device, means for applying a demodulated received television waveform comprising picture signals interspersed with blanking signals and line and frame synchronising signals to said clamp device, means for generating clamping pulses at line frequency, means for applying said clamping pulses to render said clamp device operative to clamp said waveform only during the back porch black level periods following the line synchronising pulses of said waveform, an electronic valve having a grid electrode and an output electrode, means for applying said clamped waveform to said grid electrode with the picture signals negative-going, means for biasing said electronic valve so that the line and frame synchronising pulses produce a pulse voltage at said output electrode which is proportional to the height of said synchronising pulses, and means for smoothing said pulse voltage to form a D.C. control voltage for automatically controlling the gain of at least one stage of the receiver.

6. In a television receiver, an automatic gain control arrangement comprising a clamp device, means for applying a demodulated received television waveform comprising picture signals interspersed with blanking signals and line and frame synchronising signals to said clamp device, means for generating clamping pulses, means for applying said clamping pulses to render said clamp device operative to clamp said waveform only during black level periods of said waveform, an electronic valve having a cathode, a grid electrode and an anode, means for applying said clamped waveform to said grid electrode with the picture signals negative-going, means for biasing the cathode of said electronic valve so that the line and frame synchronising pulses produce a pulse voltage at said anode which is proportional to the height of said synchronising pulses, a rectifier connected to said anode, and means for feeding said pulse voltage through said rectifier and smoothing said pulse voltage to form a D.C. control voltage for automatically controlling the gain of at least one stage of the receiver.

7. In a television receiver as claimed in claim 6, means for varying the bias applied to the cathode of said electronic valve.

8. In a television receiver, an automatic gain control arrangement comprising an electronic valve having an anode, a cathode and a grid electrode, a clamp device consisting of two rectifiers each having an anode and a cathode, means connecting the anode of the first rectifier and the cathode of said second rectifier to said grid electrode, means connecting the cathode of said first rectifier, and the anode of said second rectifier to a point of fixed potential, means for applying clamping pulses to the cathode of said first rectifier and the anode of said second rectifier, means for applying a demodulated received television waveform comprising picture signals interspersed with blanking signals and line and frame synchronising signals to said clamp device, which is rendered operative by said clamping pulses to clamp said waveform only during black level periods of said waveform, means for applying said clamped waveform to said grid electrode with the picture signals negative-going, means for biasing the cathode of said electronic valve so that the line and frame synchronising pulses produce a pulse voltage at said anode which is proportional to the height of said synchronising pulses, and means for smoothing said pulse voltage to form a D.C. control voltage for automatically controlling the gain of at least one stage of the receiver.

9. In a television receiver, an automatic gain control arrangement comprising a clamp device, means for applying a demodulated received television waveform comprising picture signals interspersed with blanking signals and line and frame synchronising signals to said clamp device, means for rendering said clamp device operative to clamp said waveform only during black level periods of said waveform, means for rendering said clamp device inoperative during interference pulses, an electronic valve having an anode, a cathode and a grid electrode, means for applying said clamped waveform to said grid electrode with the picture signals negative-going, means for biasing the cathode of said electronic valve so that the line and frame synchronising pulses produce a pulse voltage at said anode which is proportional to the height of said synchronising pulses, and means for smoothing said pulse voltage to form a D.C. control voltage for automatically controlling the gain of at least one stage of the receiver.

10. In a television receiver as claimed in claim 9, said clamp device comprising two rectifiers each having an anode and a cathode, means connecting the anode of the first rectifier to said grid electrode, means connecting the cathode of said first rectifier to the cathode of said second rectifier, means connecting the anode of said second rectifier to a point of fixed potential, a separate resistor connected across each of said rectifiers and means for applying clamping pulses to the cathodes of said first and second rectifiers, said first rectifier being cut-off during interference signals whereby the automatic gain control voltage is unaffected by said interference signals.

References Cited in the file of this patent

UNITED STATES PATENTS

| | | |
|---|---|---|
| 2,445,040 | Schade | July 13, 1948 |
| 2,589,927 | Crane | Mar. 18, 1952 |
| 2,828,356 | Macovski | Mar. 25, 1958 |
| 2,875,277 | Cope | Feb. 24, 1959 |

FOREIGN PATENTS

| | | |
|---|---|---|
| 167,161 | Australia | Mar. 18, 1954 |